July 16, 1968

L. G. BAIN ET AL 3,392,580

FLOW MONITOR

Filed Dec. 9, 1965

LEWIS G. BAIN
WILLIAM R. FRANEY
RENIC P. VINCENT
INVENTORS

BY John D. Gassett

ATTORNEY.

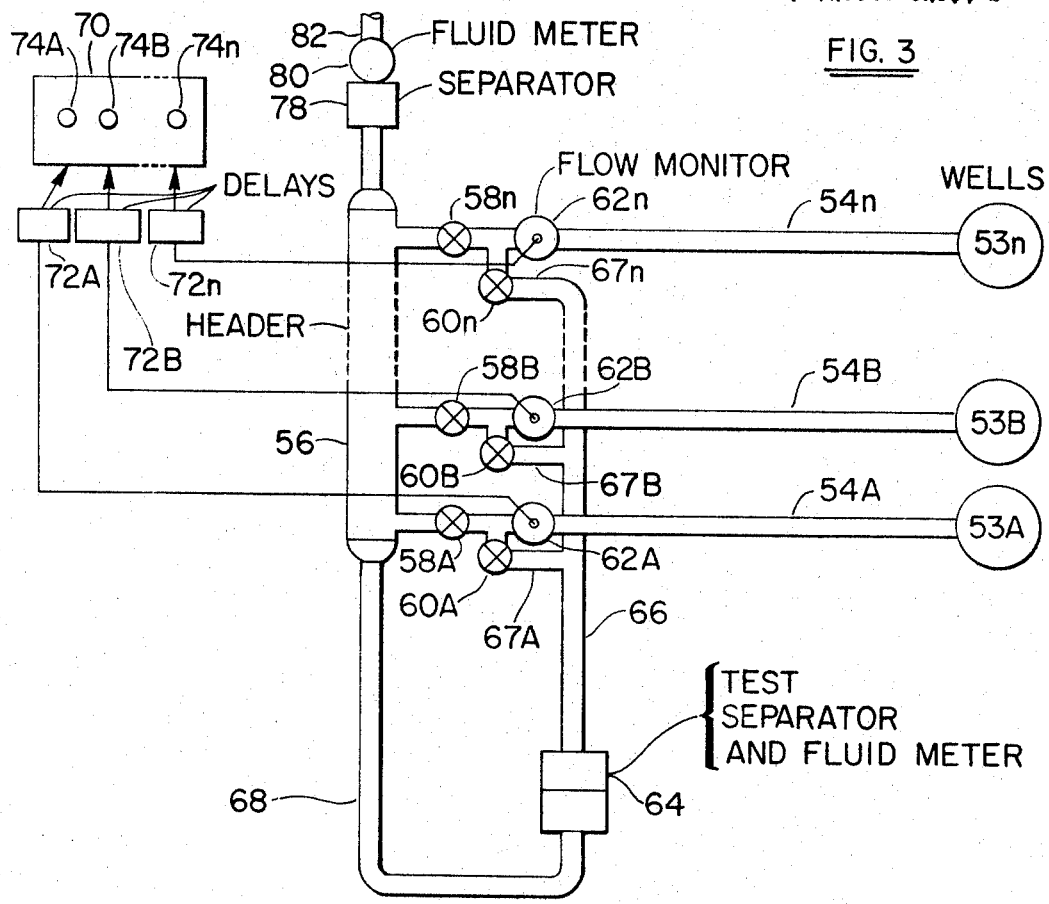
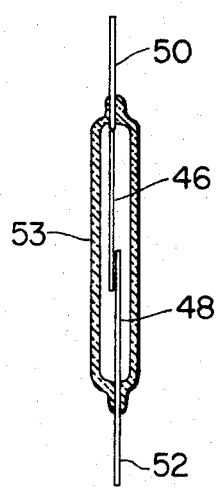
FIG. 3
FIG. 4
LEWIS G. BAIN
WILLIAM R. FRANEY
RENIC P. VINCENT
INVENTORS
BY *John D. Gassett*
ATTORNEY.

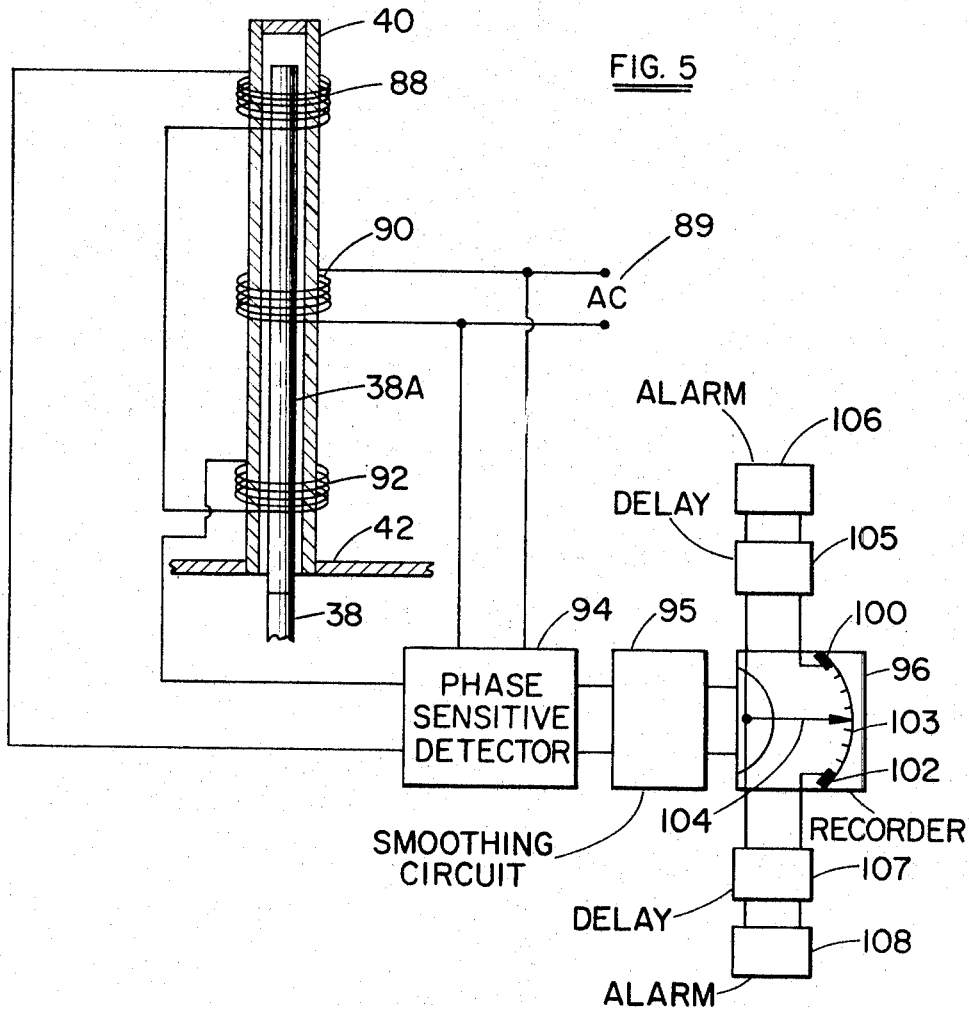

United States Patent Office 3,392,580
Patented July 16, 1968

3,392,580
FLOW MONITOR
Lewis G. Bain, William R. Franey, and Renic P. Vincent, Tulsa, Okla., assignors to Pan American Petroleum Corporation, Tulsa, Okla., a corporation of Delaware
Filed Dec. 9, 1965, Ser. No. 512,699
12 Claims. (Cl. 73—215)

ABSTRACT OF THE DISCLOSURE

This invention describes a flow monitor which can detect and meter the flow of oil in production flow lines from wells producing both oil and gas. The flow monitor is connected into the producing line and the entire produced fluid (both oil and gas) passes through such monitor. The monitor includes a completely enclosed container having only an inlet and an outlet for connecting into the flow line. Weir means is in the container between the inlet and the outlet. A float is provided on the upstream side of the weir. This float must have a positive buoyancy in the oil and a negative buoyancy in the hydrocarbon gas. Means for detecting the vertical position of the float are exterior of the container.

---

This invention relates to a monitor of the flow of fluid through a line. More particularly, this invention relates to a flow monitor for use with 2-phase flow of fluid, that is, gas and liquid, to indicate when there is flow or no flow of the liquid phase, or when such liquid flow falls below a preset minimum or increases above a preset maximum.

The device was developed in recognition of the need for an economical flow rate monitor for use in detecting significant variations in the liquid producing rate of an oil well or wells. There are commercially available devices for use in flow-no-flow service; however, they are not generally capable of detecting flow rate changes, and most are subject to false flow indication from produced gas. The monitor which is described herein incorporates features which allow detection of a moderate increase or decrease in liquid producing rate from a set value, without interference from gas flow.

In the production of oil from oil wells there is normally a considerable amount of gas produced with the oil. Flow lines from individual wells or a number of producing oil wells transfer the oil produced from the individual wells to a central gathering point commonly referred to as a tank battery. At this tank battery there is normally a gas separator or a heater treater so that the produced fluids are separated and oil and gas can be sold independently. It has been found that it is more economical to have one tank battery for a large number of wells than a smaller tank system for each well. Thus this is the reason for a central tank battery system.

In the past, before selling the oil which was stored in a tank, the amount of oil therein was gauged manually by a pipeline gauger or lease pumper by removing a cover off an opening in the top of the tank and lowering a gauge stick into the oil. Then one or the other would take samples to see if the content of the oil met the contract sales specifications. The oil in the tank was then pumped into a pipeline before any additional oil was run into the tank. In this way a fair measurement of the oil sold was made. However, in recent years there has been a large trend toward mechanizing the tank battery system so that oil from the property or properties served can be metered and run to the receiving pipeline automatically and without human efforts. This results in fewer errors and inaccuracies and increased efficiencies.

When a large number of wells are connected to a central tank battery the total oil which can be sold is of course a summation of the production of the individual wells. Therefore it is important that each well be kept producing at its designated or assigned rate. Sometimes these rates are set by government regulations and other times they are determined by either engineering or economic considerations alone. In any event each well is normally assigned an amount of production or a production rate which it is to obtain. It is important for efficient operations that the wells maintain such production rate.

In most of the recent installations, each central tank battery has a piping arrangement and a test separator or other required type vessel and associated equipment so that each well can be periodically tested as to the amount of production it is making. However with these systems it is sometimes one or two weeks or longer between testing of individual wells. If, during this time, a well has failed to produce properly, a considerable amount of current production may be lost prior to locating the problem well by conducting a series of special tests. It is thus seen that there is a need for a simple way of monitoring the flow from each well to immediately alert the operator when production of oil falls below a given minimum. On other occasions such as the case of secondary recovery operations, it is equally important to rapidly detect increased producing rates from the individual wells. This problem is made more difficulty by the fact that most wells produce gas as well as oil or oil and water; therefore, the monitor must distinguish between liquid flow and gas flow. This invention provides such a flow monitor.

It is therefore an object of this invention to provide a relatively simple but efficient means for determining when a preset change in flow of liquid is reached and is independent of the quantity of gas flow. Various other objects and an understanding of the invention can be had from the following description taken in conjunction with the drawings in which:

FIGURE 3 illustrates schematically a typical lease connection in which the flow monitor of this invention is advantageously used.

FIGURE 4 illustrates a sectional view of the switch shown in FIGURE 2.

FIGURE 5 illustrates a modification of the embodiment of FIGURES 1 and 2 whereby a low flow rate setting and a high flow rate setting can be independently adjusted at a point remote from the flow monitor proper.

Figure 1:
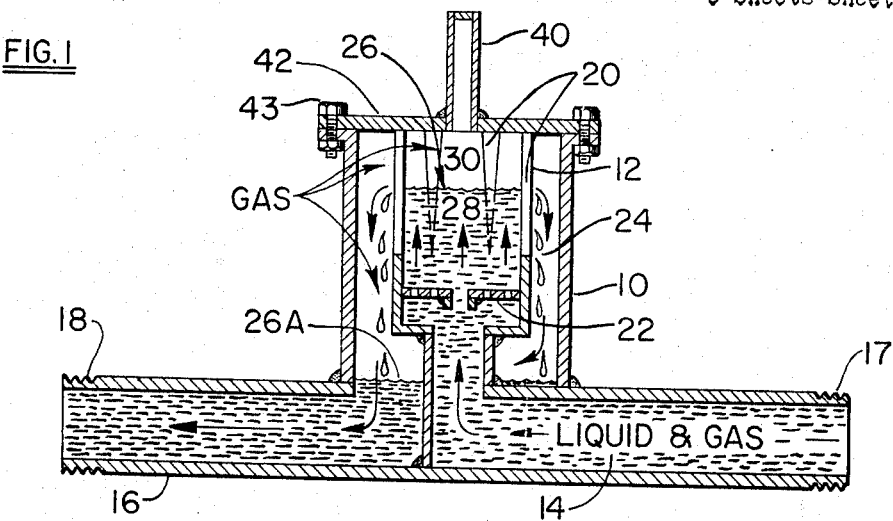
FIGURE 1 illustrates a sectional view of a preferred embodiment of the flow monitor shown without the float.
Figure 2:
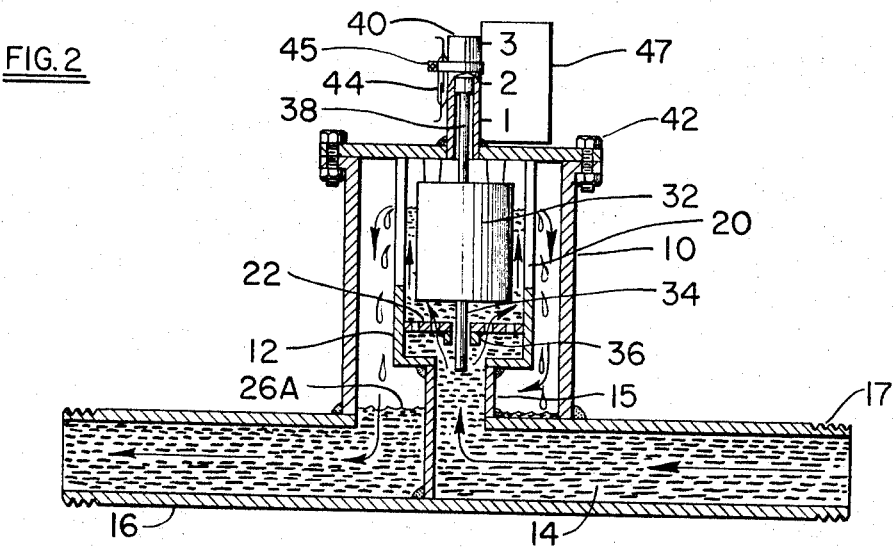
FIGURE 2 illustrates the embodiment of FIGURE 1 in which a float has been placed.

FIGURES 1 and 2 illustrate a preferred embodiment of the flow monitor of this invention. This embodiment includes an outer cylinder or vertical chamber 10 and an inner vertical chamber or cylinder 12. The lower end of inner cylinder 12 is connected by upright member 15 to inlet chamber or conduit 14. These various parts may be connected by welded joints for example. Conduit 14 has threads 17 at one end thereof. The annulus between inner chamber 12 and outer chamber 10 is in direct fluid communication with outlet chamber or conduit 16 which has threads 18 on the discharge end. Chambers 14 and 16 are preferably axially aligned and of the same diameter as the pipeline in which they are to be inserted. Thus a section of the pipeline approximately the length of chambers 14 and 16 can be removed and the device inserted in the line by threads 17 and 18 using proper collars or by using other suitable connecting arrangements.

Apertures such as V-notches 20 have been cut in the wall of inner cylinder 12 so that in effect inner cylinder 12 is modified to form a weir. A perforated plate 22 is welded or otherwise secured across the lower end of inner cylinder 12. A top or cap 42 closes the upper ends of cylinders 10 and 12 and is secured by bolts 43 for example.

Liquid and gas coming in through inlet chamber 14 must pass through the apertures 20 of cylinder 12 before it can flow out outlet 16. The liquid and gas pass through the perforations of plate 22 into the interior of inner cylinder 12. The gas and liquid then flow through apertures 20 into annular space 24 and down through outlet 16. As fluid flows through the closed system, an inner face 26 is formed in the inner chamber 12 and also an inner face 26A forms in annulus 24 between inner cylinder 12 and outer chamber 10. The vertical position of interface 26 is determined by the quantity of liquid and the entrained gas in the flowing stream and the size and shape of apertures 20. It may be well to explain that when oil is produced, there is usually produced both free gas and gas entrained within the oil. The vertical position of interface 26A is established adjacent the highest point in exit chamber 16. This is because the pressure of the free gas in the flowing stream will collect in the bell pan shape of outer cylinder 10 and depress the liquid level downward until it can be discharged through outlet 16. Thus, there is a need for free gas in the upper part of the container for the weir to act properly. The gas flows through the upper or wider parts of V-notches 20 and the liquid will rise only to the height of that portion of the V-notches necessary for the volume of liquid to pass through the weirs. Thus the height of interface 26 is a function of the amount of liquid and entrained gas being produced into inlet chamber 14.

The bulk density of the liquid is the density of the liquid as reduced by entrained gas, if any. Thus the bulk density of the flowing stream of liquid can vary widely since this is a function of the relative amounts of liquid and entrained gas flowing. In order to detect changes in the quantity of liquid throughput, a hydrometer type float is added. This includes a float 32 as shown in FIGURE 2 together with an upper guide rod 38 which extends into float guide or chimney 40 which is made of a non-ferrous or non-magnetic material, and a lower guide rod 34 positioned in guide 36 which is supported by perforated plate 22. The vertical position of float 32 depends on two factors, i.e., the vertical position of inner face 26 and the bulk density of the fluid flowing. By way of explanation, it is readily apparent that for a given quantity of liquid flowing, an increase in the quantity of gas entrained will cause the level of inner face 26 to rise, however the bulk density of the fluid flowing is decreased so that the buoyant force on the float per unit volume of fluid is decreased with the net result that the vertical position of the float is not changed appreciably.

Float guide rod 38 has a magnet attached at its upper end. Sensing means are provided to detect, from the outside of guide 40, the vertical position of float 32. One way of accomplishing this is shown. This includes a magnetic reed switch 44 mounted by adjustable clamp 45 to float guide 40. This particular reed switch is shown in FIGURE 4. Reed switch 44 includes reed members 46 and 48 hermetically sealed in a dry atmosphere in envelope 53. The reeds shown and described herein are normally open and magnetically actuated to a closed position by the magnet on rod 38 coming in the immediate proximity of the switch. Reeds 46 and 48 are connected to conductors 50 and 52 which as will be seen are connected to an alarm system.

The vertical position of magnetic reed switch 44 along float guide 40 determines at what flow rate the alarm will be actuated. Alongside float guide 40 is a vertical scale 47 which is used as a reference when making adjustments in the vertical position of reed switch 44.

In view of the buoyance and flow characteristic differences of various crude oils and oil-water mixture percentages, the proper positioning of the magnetic reed switch is made initially for any given location while a known flow rate is occurring. This usually will be performed when the normal and desired flow rate is occurring. A setting adjustment to detect a small percentage increase or decrease from this normal rate can be made easily at that time.

It is seen that the function of switch 44 is to turn on a warning light or other signal when throughput drops below or goes above a certain level. Whether the monitor is used to sense an increase or decrease in flow rate is dependent on the preset position of the reed switch 44 with regard to the location of the magnet on top of guide rod 38 when the desired normal volume of fluids are being discharged through the monitor. As will be shown in FIGURE 3, a time delay relay arrangement is provided which prevents the initiation of an alarm as a result of momentary surges in the fluid stream being monitored. It is recognized that in producing wells there are inevitable surges of liquid and surges of gas. It is also seen that, if desired, two switches similar to switch 44 can be installed, one in an upper position and one in a lower position, so that the preset monitor may indicate when either a maximum flow is exceeded or a minimum flow is not maintained.

To momentarily summarize it is seen that our monitor broadly includes an enclosed container having an inlet and an outlet for insertion into a flow line. A weir is provided in the path of the fluid flow within the container between the inlet and the outlet. A float is positioned in the container and is buoyed up by liquid behind the weir. The rate of flow of the liquid and its bulk density determines the vertical position of the float, i.e., the greater the flow of a given density fluid, the higher the float and the lower the flow of a given density fluid the lower the float. Conversely for a given quantity of liquid along with varying amounts of gas the level or interface 26 may change appreciably without appreciably changing the float level. The float is non-buoyant in the gas and is thus insensitive to the flow of gas. External sensing means are provided to detect the level of the float so that an alarm can be given when the flow of the liquid ceases or drops below a preselected minimum or goes above a preselected maximum. Thus it is truly a monitor of the flow of liquid.

FIGURE 3 illustrates how flow monitors of our invention are installed in a central production gathering facility serving a plurality of wells and from which the oil is transferred to a pipeline. Illustrated in FIGURE 3 are a plurality of wells 53A, 53B and 53n. There can be any number of wells, but only three are shown for simplicity. These are connected respectively through lines 54A, 54B and 54n to a common header 56. Header 56 is connected to a separator 78 and fluid meter 80 to line 82 in a conventional manner. The purposes of the separator is well known and is used primarily to separate the produced gas and fluids. On occasions where water is produced with the crude oil, it may be necessary to utilize a heater treater to meet contract specifications of the oil sold to the owner of pipeline. Details of these facilities will not be discussed as they are well known and have no particular bearing on the purpose and operation of the flow monitor.

It is common practice to provide a separate separator and meter or other required vessels or equipment for test purposes as indicated at reference numeral 64 for each central gathering facility. This includes a test gathering line 66 which has laterals 67A, 67B and 67n which are connected into lines 54A, 54B and 54n, respectively. Each of these laterals 67A–67n has a valve 60A, 60B and 60n located therein. Downstream of these laterals and upstream of header 56 in flow lines 54A, 54B and 54n are valves 58A, 59B and 58n, respectively. It is readily seen that by closing all the valves to the laterals 67A to 67n except the one in the line to the well to be tested, such as well 53A, for example, and having all the valves in lines 54A to 54n open except the valve in the line to the well being tested closed, that only the fluid from well 53A flows through test separator and meter 64. The outlet from such test fluid meter is passed through line 68 to header 56. In this way the quantity of the fluid produced from well 53A can be individually measured and recorded. Likewise the individual well performance of any well connected to this system can be determined. This much of the piping and valving arrangement shown in FIGURE 3 is conventional. In the preferred practice or use of our flow monitor, we insert flow monitors 62A, 62B and 62n in lines 54A, 54B and 54n, respectively, upstream of the tie-in to laterals 67A-67n, respectively.

The electrical leads 50 and 52 of each flow monitor 62A-62n are connected respectively to time delay means such as time delay relays 72A, 72B and 72n. The outlet of these delays are connected to lights or other alarms 74A, 74B, 74n on panel board 70. As we mentioned above the production of nearly all wells has surges of liquid and surges of gas. In order that such surges do not cause the alarms to light up or sound, delays 72A-72n have been installed. A suitable delay relay is manufactured by Industrial Timer Company of Parsippany, N.J. and identified as their Model TDAB (Bulletin No. 300) in which the delay is adjustable from one minute to three hours. These delays are typically set for about 10 minutes. If the switch 44 stays closed for over this set period of time, then an alarm is actuated. An attendant can then check on the particular well which is not producing its allotted amount of liquid. With this arrangement, the operator is made aware of the problem almost immediately and does not have to wait for individual wells to be tested. The fact that a well is not making its production indicates that immediate action needs to be taken. Many things can cause a well to fail to make its allocated production such as a worn or faulty bottom hole pump if the well is being pumped, equipment failures or malfunctions that result in loss of desired operating speed, or a complete shut down of operations, etc. Our system permits the operator to know immediately when the well is in trouble so that remedial steps can be started as soon as the trouble begins so that the production rate can be more nearly maintained.

We mentioned above that the switch 44 can be adjusted vertically for a given flow rate within the range of the weir selected. Additionally the number and size and shape of the apertures 20, cylinders 10 and 12 can be changed to accommodate various ranges of flow of liquid and gas. It is also important to note that the alarm lights on panel 70 can be installed at a central control panel which is remote from the flow monitor installation. In fact, the panel can be provided for a multitude of installations such as illustrated in FIGURE 3. The inner cylinder 12 should be sufficiently large compared to the size of the float so that the anticipated maximum rate of gas can flow past the float without forcing the float up, thus any upward movement of the float will be caused by the buoyant force of produced liquid. In one flow monitor which has been successfully used, the outer cylinder 10 had a diameter of 8" and an axial length of 10"; inner cylinder 12 a diameter of 5", and an axial length of 10"; apertures 20 were V-notches 4" long and about 10°; the float was 3" in diameter and had a height of 6". The float was made of steel 0.032" thick. The inlet and outlet lines, as indicated at threads 17 and 18 in FIGURES 1 and 2 were nominal 2" pipe threads. In the field tests conducted thus far have indicated this size unit and weir arrangement to be very satisfactory for daily liquid flow rates from about 30 bbls./day to about 300 bbls./day which was primarily crude oil. In these tests the gas-liquid ratios varied from 10 c.f./bbl. to 1000 c.f./bbl. Tests in the laboratory have indicated the unit to be capable of satisfactorily handling much higher gas-liquid ratios without any adverse effects on monitoring the liquid flow rate.

It is seen then that the flow monitor is of utmost importance in systems for gathering oil from wells, particularly for limited attendance, automated installations. The instrument can be adjusted to indicate a flow or no flow condition of liquid with complete disregard as to produced gas. The basic design of the instrument eliminates the effects of the produced gas and only the flow of liquids are sensed by the monitor. Also, by means of external adjustment such as moving switch 44 vertically, the flow monitor can be preset to indicate an alarm condition when the production declines below a predetermined minimum flow or increases above a predetermined maximum.

A modification of this invention is shown in FIGURE 5. In that embodiment there is a means provided for both a low limit alarm and a high limit alarm and also means for recording an indication of the position of the float with respect to time. In this embodiment float stem 38 is modified such that the upper end 38A is a core such as used in electrical transformers. Wrapped around chimney or stem guide 40 is an upper coil 88, a lower coil 92 and an intermediate or center coil 90. Center coil 90 is excited by suitable electrical signal from an AC source which can be of any convenient frequency such as 60 cps. The upper coil 88 and lower coil 92 are connected in phase opposition. The three coils and the core 38A can be considered the principal parts of a linear transducer. The ends of the windings of coils 88 and 92 not connected to each other are connected to a phase sensitive detector 94. The leads to coil 90 from source 89 are likewise connected to phase sensitive detector 94. The output current of detector 94 is then a function of the position of core 38A which in turn is a direct function of the position of the float.

There are frequently flutter or vibrations of the float. The resulting signal is averaged by a smoothing circuit 95 which can, for example, be an integrator connected to the output of detector 94. The output of smoothing circuit 95 is connected to an indicating recorder 96. The record of recorder 96, for a given flow condition of liquid and gas flow, can be considered a fairly reasonable indication or record of the quantity or rate of flow of such liquid.

Recorder 96 is provided with an indicator 104 which points to a scale 103. A lower limit contact 100 and an upper limit contact 102 are provided along the arc of the pointer and can be adjusted by an operator in the field. Contact 100 is connected through a delay 105 to an alarm 106. The reasons for delay 105 are the same as those for delay 72A in FIGURE 3. When pointer 104 touches contact 100, it acts as a switch being closed and thus a signal is fed to delay 105 which, if maintained for the duration of the delay of delay 105, actuates alarm 106. A high limit circuit alarm means is provided for contact 102 the same as the system for the lower limit alarm. This includes a delay 107 and alarm 108. This system of this embodiment is ideally suited for those situations where it is desired to change the low or high limit alarm at frequent intervals. By the use of this system the recorder 96 can be positioned in a central panel room which can be miles from the well or tank with which it is associated. Thus, at one location, production condition can readily be monitored on a large number of wells.

FIGURE 5 illustrates one way of transmitting information indicating the position of the float of the flow monitor to a distant location. However, it is to be understood that there are other electrical transmission circuits known where a movable armature or movable core transformer is used as a transmitter.

While the above described embodiments of the flow monitor have been described with a certain amount of detail, it is to be remembered that various other modifications can be made therein without departing from the scope of our invention.

We claim:

1. An apparatus for insertion in a flow line through which a liquid and a gas can flow, to detect selectively the flow of liquid which comprises:
   a completely enclosed container comprising an outer cylinder having only an inlet and an outlet for connecting into the flow line;
   an inner cylinder supported within said outer cylinder, said inner cylinder having apertures in the wall thereof for the passage of fluid to the annulus between said inner cylinder and said outer cylinder, thus forming a weir means;
   a float within said container and on the upstream side of said weir, said float having a positive buoyancy in said liquid and a negative buoyancy in said gas;
   a perforated plate in the lower end of said inner cylinder;
   means connecting the lower end of said inner cylinder below said perforated plate to said inlet;
   means connecting the annulus between said inner cylinder and said outer cylinder to said outlet;
   sensing means exterior said container for detecting the vertical position of said float.

2. An apparatus as defined in claim 1 in which said container means has a vertical float guide;
   a float guide rod connected to said float and extending into said float guide, said float guide rod having a magnet thereon;
   a magnetic switch positioned on the exterior of said float guide and actuatable by the magnet located on said float guide rod.

3. An apparatus as defined in claim 2 including an alarm connected to said magnetic switch.

4. An apparatus as defined in claim 3 including a suitable time delay feature in the connection between said magnetic switch and said alarm.

5. An apparatus as defined in claim 4 including means for adjusting the position of said magnetic switch and including a scale adjacent said magnetic switch.

6. An apparatus as defined in claim 1 in which said sensing means includes means for recording the detected position of the float.

7. An apparatus for insertion in a flow line through which a liquid and a gas can flow for detecting the flow of liquid which comprises:
   an outer cylinder;
   an inner cylinder concentrically positioned within said outer cylinder;
   a cap means completely enclosing the upper end of said inner cylinder and said outer cylinder, said cap having a centered guide tube extending axially to said inner cylinder, said guide tube enclosed at its outer end and with its inner end opening into said inner cylinder;
   a perforated plate in the lower end of said inner cylinder;
   an inlet conduit in fluid communication with said inner cylinder beneath said perforated plate, said inner cylinder having a notch in the wall thereof forming a weir above said perforated plate;
   an outlet conduit in fluid communication with the annulus between said outer cylinder and said inner cylinder;
   the lower ends of said outer cylinder and said inner cylinder being closed except for the fluid communication with said inlet conduit and said outlet conduit, respectively;
   a float positioned within said inner cylinder above said perforated plate, said float having an upper guide rod adapted to be inserted in said guide tube of said cap and a lower guide rod, said upper and lower guide rods axially aligned with said float, said perforated plate adapted to receive said lower guide rod in a guiding relation, said upper guide rod having a magnet, said float being sufficiently smaller than said inner cylinder so that gas can readily pass upwardly through said inner cylinder without lifting said float;
   means exterior of said guide tube of said cap for detecting the position of said magnet.

8. An apparatus for insertion in a flow line through which a liquid and a gas can flow, to detect selectively the flow of liquid, which comprises:
   a completely enclosed container having a top side and a bottom side, said container having a first conduit means and a second conduit means for connecting into said flow line;
   an inner cylinder having apertures in the wall thereof forming a weir for the passage of fluid between the interior of the said inner cylinder and the interior of said container exterior said inner cylinder, the lower end of said inner cylinder being connected to said first conduit means and the other end extending upwardly toward the said top side of said container;
   a float supported for movement within a substantially vertical path within said container and on the upstream side of said weir, said float having a positive buoyancy in said liquid and a negative buoyancy in said gas, the horizontal cross-sectional area of said path being greater than the cross-sectional area of said float such that free gas in the fluid passing through the flow line flows upwardly around the float to the top of said container such that only the liquid level controls the level of said float; and
   sensing means exterior said container for detecting the vertical position of said float.

9. An apparatus as defined in claim 8 in which said sensing means includes a transducer for detecting the position of said float, said transducer comprising a center coil, an upper coil and a lower coil, each wound about a float stem guide, said center coil independently excited and said end coils connected in phase opposition; and a core movable within the float stem guide and connected to said float.

10. An apparatus as defined in claim 9 including means to indicate at a remote location the position of said core within said float stem guide.

11. An apparatus as defined in claim 8 including an alarm means responsive to said sensing means when said float reaches a preselected vertical position.

12. An apparatus as defined in claim 11 including delay means between said sensing means and said alarm means such that said sensing means must detect said preselected position for a selected length of time before said alarm is actuated.

References Cited

UNITED STATES PATENTS

| | | | |
|---|---|---|---|
| 1,067,491 | 7/1913 | Simmance et al. | 73—215 |
| 1,589,418 | 6/1926 | Woidich | 73—216 |
| 1,671,106 | 5/1928 | Fisher | 73—215 |
| 2,781,660 | 2/1957 | Gobel | 73—215 |
| 2,815,765 | 12/1957 | Adelson | 73—216 X |
| 2,820,865 | 1/1958 | McKinnies | 73—290.1 X |
| 3,104,549 | 9/1963 | Humbert et al. | 73—205 X |
| 3,246,517 | 4/1966 | Malkiewicz | 73—308 |

FOREIGN PATENTS

| | | |
|---|---|---|
| 1,157,806 | 1/1958 | France. |

RICHARD C. QUEISSER, *Primary Examiner.*

EDWARD D. GILHOOLY, *Assistant Examiner.*